May 11, 1937.    H. J. PETERSON ET AL    2,080,150
TESTING AND SCORING DEVICE
Filed April 3, 1934    2 Sheets-Sheet 2
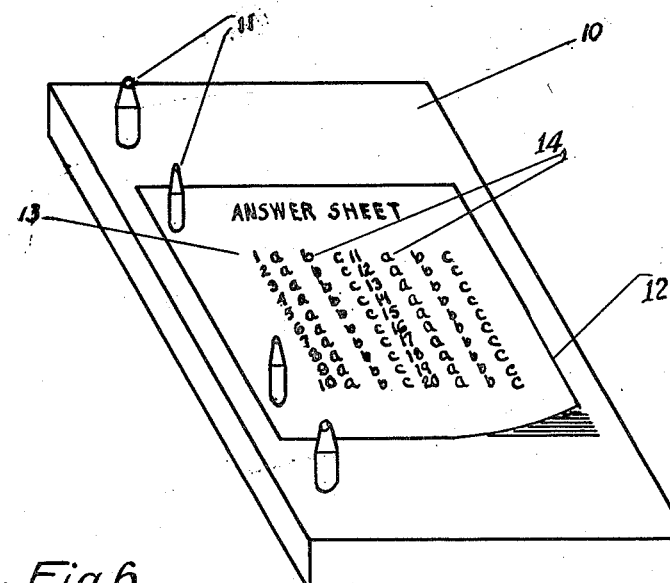
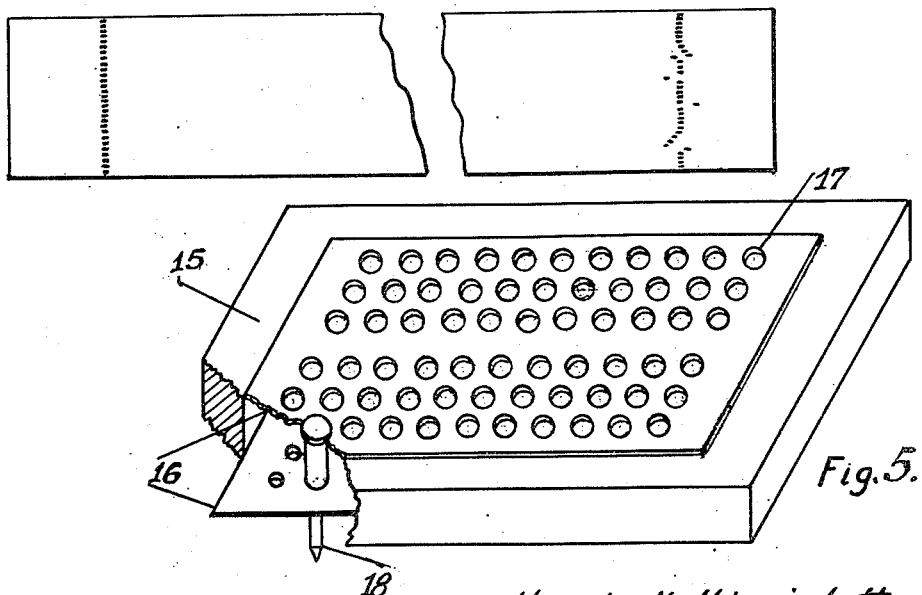
Harold H. Higginbottom
Hans Jordan Peterson
John Christian Peterson
INVENTORS
By Laforest S. Saulsbury
atty Patented May 11, 1937

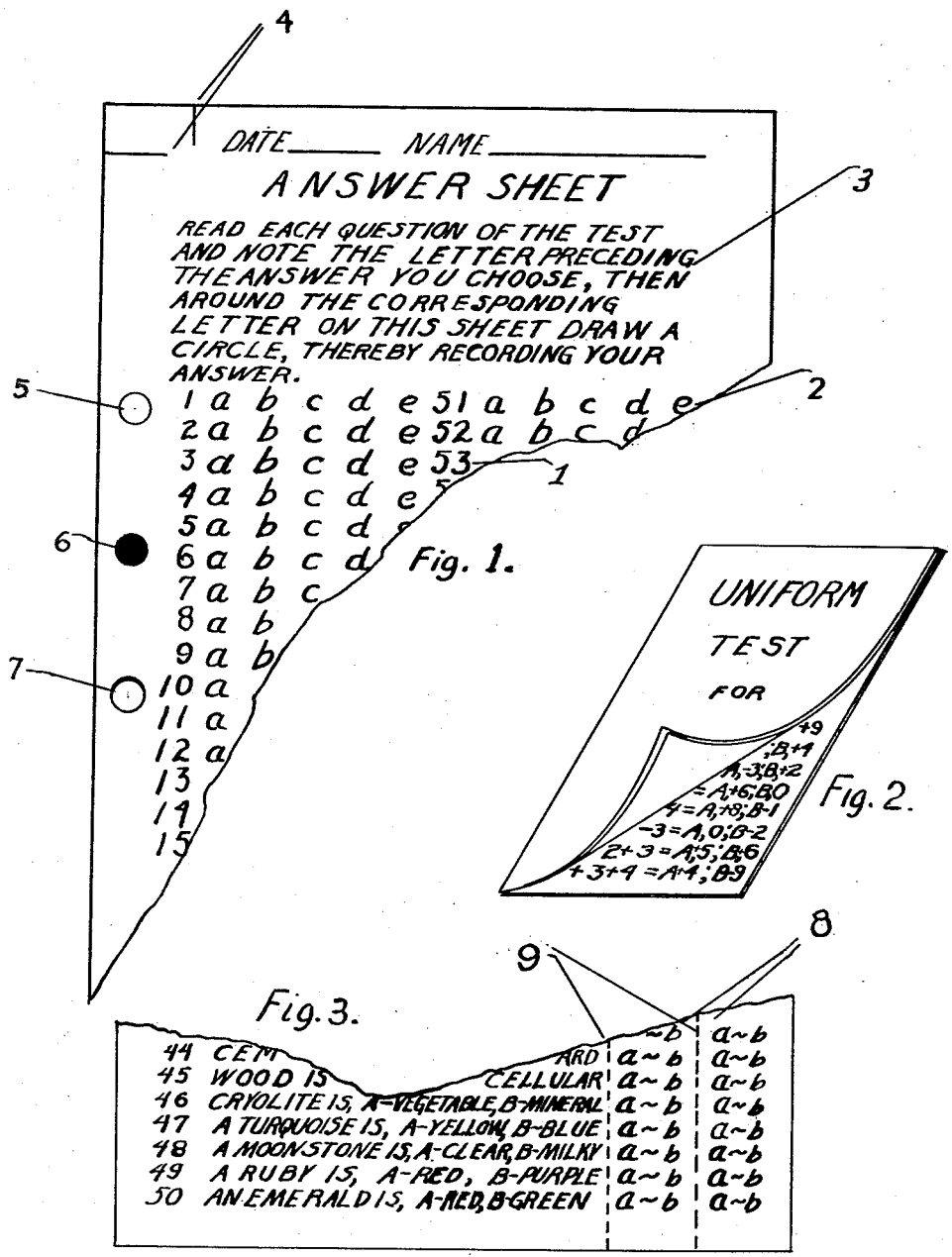

2,080,150

UNITED STATES PATENT OFFICE 2,080,150

TESTING AND SCORING DEVICE

Hans Jordan Peterson, Hattiesburg, Miss., and John Christian Peterson and Harold H. Higginbottom, Manhattan, Kans.

Application April 3, 1934, Serial No. 718,878

4 Claims. (Cl. 35—48)

This invention relates to an improvement in the methods of giving and scoring objective tests, and in analyzing the recorded data on other subjects such as scientific investigations, sociological and statistical records. By means of this invention the marking of the data is done mechanically with much greater speed and accuracy than has heretofore been attained. This device utilizes present practice in the use of printed or mimeographed data or answer sheets with an indicated answer location for each optional answer to each question or for each of a wide variety of solutions for each problem, question or exercise.

For purposes of description in this patent application the word "register" is taken to mean the alignment of two or more identical or comparable locations on one or more sheets in any plane appropriate to the purpose to be accomplished. The following words also will have meanings that follow.

"Answer" will include a reply to a question, a solution of a problem, or a response to a statement, exercise or direction. In some cases it may include a simple statement.

"Question" will include an inquiry, interrogation, problem, direction, exercise or a statement which presents a choice or preference.

"Optional answer" will include any of the alternative answers listed after any question as the terms answer and question are defined in the foregoing.

"Answer location" here means any indicated area or portion of a surface designated as the proper place for recording a choice of answers as the term answer is here defined.

"Answer sheet" will here mean any sheet provided with answer locations for the recording of answers of any sort including those listed in the foregoing definition.

"Question sheet" will be any sheet presenting any of the forms of directions included in the foregoing definition of question. For purposes of recording answers a question sheet may also contain answer locations, or an answer sheet may contain the questions whose answers are to be recorded upon it.

"Pegs" or "alignment pegs" are any device which may protrude from the associated mechanism by means of which answer sheets may be brought into alignment or register.

"Alignment board" is any device on which the answer sheets are brought into alignment or register for purposes described in the following text.

"Pins" or "perforating pins" include any device that is used to pierce the answer sheets to produce marks at desired locations, whether it displaces a portion of the sheet in passing through or cuts to remove a portion of said sheet.

"Key plate" is any device used to hold a plurality of perforating pins in predetermined locations. It may also serve as a part of the guide device for marking more than one answer location at one operation.

"Mark" as applied to the designation of right or wrong answers, means a perforation made by a perforating pin.

The new features here introduced are concerned with means of securing accurate register when a plurality of answer sheets are piled in a stack, of maintaining such register while such answer sheets are being marked, of marking either the correct or incorrect answers quickly, clearly and with great accuracy, and of holding the answer sheets singly or plurally in register with the marking device while the answers are being marked.

The accompanying drawings illustrate an operative embodiment. In said drawings:—

Figure 1 is a plan view of a section of one style of answer sheet used with this invention.

Figure 2 shows another style of answer sheet in which both the questions and the optional answers are printed together in booklet form.

Figure 3 shows a plan view of a section of another style of sheet in which the questions and answer locations are printed together, and in addition more than one set or strip of answer locations are provided with some means of removing the outermost set after each use. So made, the sheet becomes re-usable as many times as there are strips of answer locations provided.

Figure 4 shows one form of alignment board with alignment pegs for two sizes of sheet. A small size sheet is shown in place on the alignment pegs. When a sheet of larger size is used on an alignment board of this type, it may be punched with holes large enough to pass over the pegs for the smaller sheet later to be mentioned.

Figure 5 shows one form of key plate one corner of which is shown in section with one perforating pin shown in place.

Figure 6 shows the appearance of the edge of a stack of sheets on which have been printed the lines for checking alignment of the printing or the punching of alignment holes. The left hand view shows the appearance of sheets in satisfactory alignment, and the right hand view shows sheets in unsatisfactory alignment.

Referring specifically to Figure 1, the answer sheet is shown to be provided with separate indicated lines (1) in which all the answer locations (2) for any given question are designated. These portions (1) and answer locations (2) are identified by numerals or other suitable characters corresponding to the questions and choices presented on the question sheet, or booklet. For convenience and standardization the answer locations (2) may preferably be distributed with uniform spacing, and surrounded by uniform but not necessarily equal margins which may be filled in whole or in part by printed characters such as instructions for use (3), name, date, and other pertinent information. These margins or the edges of the sheet may be used to secure accurate alignment of the sheets for purposes of marking. To further facilitate and improve the accuracy of alignment, openings (5) may be provided at proper locations on one or more margins, or at any other suitable place on the sheet. Obviously the alignment openings may be so placed that any or all of the answer sheets may be turned over, upside down, or upside down and over, and still retain perfect alignment with the perforating pins in the multiple perforator composed of the structures shown in Figures 4 and 5, or so that some sheets may be turned over, some upside down, and others upside down and over, and their answer locations still retain accurate alignment. This arrangement may require additional pegs or alignment openings at other locations.

Figure 2 shows an embodiment of our invention in which the question sheet or booklet is also the answer sheet. In this embodiment the said answer locations (1), in Figure 1, are located at appropriate positions on the question sheet. While the spacing for this type need not be uniform, it is more convenient to have it identical on comparable sheets. In the case of large question booklets it is possible to arrange all of the correct answers in such form that all of them and no others will be marked when the entire book is pierced, thus making one perforating operation serve for one or more books. To increase the flexibility with which this arrangement for perforating a whole book in one operation may be carried out, it may be found convenient to provide a means of aligning the answer locations for marking when they are not in directly comparable positions on the successive sheets. For example, the alignment openings may be so placed that when they are all slipped over some form of alignment structure the various pages of the booklet will be drawn out of their original positions with respect to one another. Such a drawing away from the original positions in the book will usually require a folding or slight bending of the booklet, while at other times it will be more convenient to cut along the folded or bound edge to permit a more complete realignment of the pages. To facilitate scoring in this case, answer locations may be indicated by definite outlines, and markings (perforations) falling outside the boundaries of such answer locations may be disregarded in counting.

Figure 3 shows a section of the plan view of another form of answer sheet or booklet in which one page serves the double purpose of question sheet and answer sheet, and also includes the additional feature of the detachable answer strips (8) arranged for easy removal by means of the perforations or other markings (9). These detachable answer strips enable the user to perceive his successes or errors in direct relation to the problems or questions and yet to render the sheet reusable by the removal of each used strip after scoring and review. Obviously the strip nearest the edge should be used first in order that it may be detached after use without affecting the other unused strips. Any number of detachable strips may be employed, depending upon the difficulty of the questions and the need for review, or by the number of times it is intended to reuse the set of questions.

The forms of question and answer sheet shown in Figures 2 and 3, where the question and the answer location are placed on the same sheet, are designed to help keep the user more unerringly and with greater ease on the correct line. This arrangement is especially helpful to immature pupils.

In the view of the alignment board (10), Figure 4, the alignment pegs (11) used to align the sheets for marking by having the holes in the answer sheet (12) slipped over them, are shown. These pegs may be tapered from the tip so that they will draw the papers to be marked into accurate alignment before the untapered portion of the peg is reached. This arrangement facilitates placing a random group of sheets on the pegs for marking. When the spacing of the answer locations does not correspond to that of any multiple punching device available, this type of alignment board lends itself admirably to punching out the answers one at a time by means of a hand awl. In Figure 4 the alignment pegs (11) for the small sheet are shown smaller than those that are provided for use with the large sheet. When the pegs are arranged in this fashion, the removal of the smaller pegs when large sheets are used, is avoided by punching in the large sheets a hole larger than the small pegs so that it will slip over them with little or no friction. The pegs may all be made the same size with the holes in the sheets to match, but it is more convenient when only two pegs are required to produce alignment.

Just as the awl mentioned in the foregoing paragraph makes possible the marking on one answer location on many answer sheets with one stroke, so the multiple perforator makes possible the marking of any or all chosen answer locations on one or more answer sheets with one stroke. The multiple perforator consists of an alignment board such as that shown in Figure 4, and a key plate such as shown in Figure 5, held in accurate alignment by any one of numerous well known mechanical means so constructed as to enable the alignment board and the key plate to be drawn together and separated with sufficient force to accomplish the perforation of any desired number of answer locations on any desired number of answer sheets, and the subsequent stripping of the sheets from the perforating pins. The key plate as shown in Figure 5, is provided with a plurality of openings (17) through which perforating pins (18) may be inserted corresponding to each and every answer location on the answer sheet. This key plate must be effectively thick enough to hold the perforating pins in alignment, or the heads of these pins must be large enough and of the proper shape to accomplish this purpose. In the design of the key plate shown in Figure 5, the effective thickness is provided by separating the punched or drilled sheets (16) with a frame structure (15) of adequate thickness to give the required accuracy of pin alignment, with pins approximately parallel, and all perpendicular to the surface of the answer sheet.

Since accuracy of location of the printed material and the punched holes used for alignment is necessary to the greatest usefulness of the answer sheets, means of checking the alignment of both of these have been provided. The accuracy of location of the printed material is checked by the use of one or more lines (4), Figure 1, printed across one edge of the page on which it appears, leaving a mark that is visible from the edge of a group of stacked sheets. When the group of sheets to be tested for alignment is stacked with edges evened, the individual marks on the edges of sheets will form a straight line visible from the side as shown in the left portion of Figure 6, if the printing has been done with acceptable accuracy. The appearance of a group of sheets not done with acceptable accuracy is shown in the right hand portion of Figure 6. Any departure from a straight line that is compatible with the structure of the sheet and the use to which it is to be put may be established as a tolerance, and the sheets showing a greater departure may be removed and discarded.

To permit a check on the accuracy with which the punched alignment holes are located with respect to the printing, an arrangement similar to that shown in Figure 1 may be employed. Here a mark (6) the same size as the required alignment opening is printed at the point where the alignment opening is to be punched, with the same operation that prints the remainder of the sheet. When the punched alignment opening is made, this mark will be wholly removed by the punching operation if the opening is punched at the right place. If, however, the punching is not done at the right place, there will be a part of the printed mark remaining at the edge of the opening, indicating that the sheet should be discarded. The little crescent shown at (7) in Figure 1 is typical of the appearance of an incorrectly punched alignment opening. It is obvious that if the alignment openings are used to guide the stacking of the sheets for checking by means of the lines printed across the edge, that the uniformity of margins becomes of little importance.

To increase the visibility of perforations marking the chosen answers on the answer sheet, the identifying characters may be printed with a color of ink which, while satisfactorily visible on the color of paper used for the answer sheet, contrasts sharply with the dark perforations and the recorded answer markings. For example, green characters are highly visible on white paper and contrast sharply with dark pencil marks and perforations.

Weightings to indicate the relative importance of various items is being commonly employed in tests and records, and it is proposed to use with the devices herein described, sets of symbols representative of the importance of the items for which they stand. These symbols may be made in a great variety of geometrical forms. In case the number of different weightings to be considered is too great to be represented by easily distinguishable symbols, color may also be added. Thus the figure of a star printed in black might be used to represent a count of eight units, while the star printed in red might be used to represent a count of eighteen units, and a blue star to represent a count of twenty-eight units. To illustrate how counting might be done with this arrangement, all the perforated red symbols would count ten without regard to their form, and all the perforated blue symbols would count twenty without regard to form. When these totals had been made or calculated, then all the perforated stars, without regard to their color, would be summed, each counting eight units toward the total. In the same manner the units count would be totaled for each of the other symbols, without regard to color. A further modification of the foregoing arrangement for counting may be employed when both positive and negative values are to be assigned to answers. In this case, two sheets, printed with the proper arrangement of the aforesaid symbols, are perforated to correspond to the answers given on the answer sheet, and the total marked on each sheet separately calculated. The total from one sheet represents the positive, and from the other the negative count. To aid in the identification and avoid confusion, the two sheets may be printed on paper of different color representing the sign of the values marked thereon. Opposite sides of the same sheet may obviously be used to accomplish the same purpose as the two sheets just mentioned.

The foregoing arrangement may be further extended for use in totaling the type of examination or record that requires several different weighted scorings of the same set of answers. To illustrate how this may be acomplished, suppose that the answers indicated on a given record are to be scored with weighted values, both positive and negative, in ten different ways. Ten different counting keys would be prepared, each composed of two sheets or two sides of one sheet. These counting keys would be printed with the aforesaid symbols arranged to total in the ten different ways called for by the ten different ways of scoring. All the counting keys would then be perforated to correspond to the replies given on the original answer sheet, and the totals drawn or calculated for each of the ten different weighted scorings in the manner described for drawing the total for one pair of sheets or the two sides of one sheet, representing positive and negative values.

A slight modification is useful to facilitate the use of our device as a teaching instrument. To permit the immediate return to the user of a marked copy of his answer sheet while the examiner or instructor retains a marked duplicate copy of this sheet, it is helpful to provide two identical columns with identical answer and question numerals between which is placed a perforated line or other means for facilitating the division of the sheet. In this case the user is instructed to indicate his answer choice in each of two columns. After marking the instructor may divide the sheets and return a marked copy to the student for counting. The copy kept by the examiner or instructor may be used as a record and a check on the student's count. Such speedy and accurate marking endows a properly constructed test with a radically new function in teaching by enabling the student, while the question sheet is still in his hand, to note his errors and to correct any misconceptions he may have had by reference to the text books, or by asking questions in class discussion. It also enables the student to learn his score and his comparative rank immediately while his interest is most keen. The same useful values may be obtained with a little less facility by asking the student to record his chosen answer in two places on the same horizontal line of an ordinary answer sheet. In either of these cases the strips can easily be separated with a cutter or a pair of scissors.

A further slight modification serves to hinder or prevent copying of one user's paper by another. To accomplish this, the numerals designating answer locations may be printed in different orders on similar sheets. With a little care these numerals can be so arranged that sheets having two or more distributions of said numerals can be marked simultaneously if placed with different edges over the alignment pins or by inverting the sheets. One method of accomplishing this is to arrange two sheets so that the numerals on one horizontal line of one sheet read in the same order from left to right that those on another sheet read from right to left. Still another method by which this may be accomplished is to have the numerals on the first question sheet arranged so that the vertical order is reversed on another sheet. Obviously these two arrangements can be combined to give several different arrangements of numerals that may be marked at one operation and with one setting of the pins in the key plate.

To obtain the utmost secrecy the numerals may be printed in type so small that a magnifying instrument in the possession of each student must be used to identify them. If these magnifying devices were of short enough focal length, copying would become impossible without voluntary cooperation among students.

A useful addition to the multiple perforating device is a stripper plate through which the perforating pins may be pushed and retracted at each operation. By the use of this plate pierced by a hole in alignment with each and every possible answer location, answer sheets to be marked may be kept out of contact with the perforating pins until the desired perforating position is reached, and after such perforation the papers are removed from the pins which have passed through them as the pins are retracted through the plate.

It is also obvious that in the system described for representing numbers by geometrical symbols and colors that the functions of form and color may be reversed or combined in various ways to better fill the particular need such combination is designed to serve.

Having thus fully described this invention, what we claim as new and desire to secure by Letters Patent is:—

1. A testing and scoring device comprising in combination with a base, a plurality of sheets arranged in superposed alignment each provided with indicated locations for the recording of optional answers, a key plate provided with perforating pins, said pins being positioned to perforate the correct answer locations on the answer sheets upon superposed alignment of the key plate and answer sheets, and means for holding the foregoing parts in superposed alignment so that by pressing the key plate and base board together with sufficient force to thrust the said perforating pins through all the answer sheets, the correct answer locations are marked by perforations, and the incorrect answer locations are not so marked.

2. A testing and scoring device comprising a base having alignment pegs, a plurality of sheets arranged in superposed alignment each provided with indicated locations for recording optional answers and having holes adapted to receive said alignment pegs, a key plate provided with removable perforating pins, said pins being adapted to be positioned to perforate the correct answer locations on the answer sheets upon superposed alignment of the key plate and answer sheets, and means for holding the key plate in superposed alignment with the base and answer sheets so that by pressing the key plate and base board together with sufficient force to thrust the said perforating pins through all the answer sheets, the correct answer locations are marked by perforations and the incorrect answer locations are not so marked.

3. A testing and scoring device comprising in combination with a base having alignment pegs, a plurality of answer sheets arranged in superposed alignment each provided with indicated locations for recording optional answers and having holes adapted to receive said alignment pegs, a key plate provided with perforating pins, said base being readily detachable to facilitate the proper superposition of the answer sheets on the alignment pegs and their subsequent removal therefrom, said pins being positioned to perforate the correct answer locations on the answer sheets upon superposed alignment of the key plate and answer sheets, and means for holding the key plate in superposed alignment with the base and answer sheets so that by pressing the key plate and base board together with sufficient force to thrust the said perforating pins through all the answer sheets, the correct answer locations are marked by perforations and the incorrect answer locations are not so marked.

4. A testing and scoring device comprising in combination with a base, a plurality of sheets arranged in superposed alignment thereon, each provided with spaced indicated locations for the recording of correct and incorrect answers, a key plate adapted to be superposed to said answer sheets and having spaced apertures aligned respectively to the spaced answer locations, removable perforating pins adapted to be positioned in such of said apertures as correspond to said indicated locations for correct answers to perforate said locations upon superposed alignment of the key plate and answer sheets, and means for holding the foregoing parts in superposed alignment so that by pressing the key plate and base board together with sufficient force to thrust the perforating pins through the answer sheets, the correct answer locations are marked by perforations and the incorrect answer locations are not so marked.

HANS JORDAN PETERSON.
JOHN CHRISTIAN PETERSON.
HAROLD H. HIGGINBOTTOM.